United States Patent [19]

Mankovitz

[11] Patent Number: 5,499,103
[45] Date of Patent: Mar. 12, 1996

[54] APPARATUS FOR AN ELECTRONIC GUIDE WITH VIDEO CLIPS

[75] Inventor: Roy J. Mankovitz, Encino, Calif.

[73] Assignee: E Guide, Inc., Beverly Hills, Calif.

[21] Appl. No.: 139,590

[22] Filed: Oct. 20, 1993

[51] Int. Cl.$^6$ ............................. H04N 5/76; H04N 5/91; H04N 5/78; G11B 5/02

[52] U.S. Cl. .................. 358/335; 358/341; 358/343; 360/19.1; 360/10.1; 360/33.1; 360/69

[58] Field of Search ....................... 358/335, 310, 358/342, 341, 343, 312; 360/19.1, 69, 10.1, 10.3; H04N 5/76, 9/79, 5/78, 5/92, 5/91

[56] References Cited

U.S. PATENT DOCUMENTS

| | | | |
|---|---|---|---|
| 4,025,851 | 5/1977 | Hasselwood et al. | 325/31 |
| 4,953,153 | 8/1990 | Suzuki | 358/343 |
| 5,031,051 | 7/1991 | Kim | 358/312 |
| 5,184,254 | 2/1993 | Kaneko et al. | 360/10.3 |
| 5,307,173 | 4/1994 | Yuen et al. | 358/335 |

*Primary Examiner*—Thai Q. Tran

*Attorney, Agent, or Firm*—Christie, Parker & Hale

[57] ABSTRACT

Apparatus and methods for an electronic guide with video clips are provided. The method includes the step of providing a video cassette tape having a first length of video cassette tape having a first index mark written in the control track near the beginning of the first length and a second index mark written in the control track near the end of the first length, a guide grid to video clips on the video cassette tape written in the video track between the first and second index mark, and guide data written as tones in the audio track between the first and second index mark, the guide data associated with the guide grid including for each video clip contained on the video cassette tape a number of index marks either forward or backward on the tape from the guide data to the video clip. A plurality of video clips are provided on the video cassette tape, each video clip having a third and fourth index marks written in the control track near the beginning and end, respectively, of the video clip, video for the video clip written in the video track between the third and fourth index mark, and audio to accompany the video written in the audio track between the third and fourth index mark. In another method the electronic guide with video clips is broadcast with an initialization message and broadcast indication near the start of the broadcast.

10 Claims, 9 Drawing Sheets

APPARATUS FOR AN ELECTRONIC GUIDE WITH VIDEO CLIPS

BACKGROUND OF THE INVENTION

This invention relates generally to electronic guides and particularly to electronic television guides, such as television program schedule guides. This invention also relates to the indexing of an electronic guide with video and/or information clips.

Previews of upcoming movies or television programs are commonly shown to generate interest in them. One technique is to show clips of the video before or after the full presentation of another program. This is done both for television programs or movies to be shown on television. Increasingly common is the inclusion of video clips of other movies on a rented video cassette tape. The renter of the video cassette tape rents the tape to watch a particular movie, but also can watch the previews, which are put onto the otherwise unused tape in the video cassette. A problem with this conventional technique is that the viewer must watch the entire tape to ascertain which previews are present.

Also increasingly common is the video cassette tape with infomercials. Usually, only one infomercial is put on a tape, for example a Plymouth Voyager advertisement, and the tape is mailed out to potential buyers. If more infomercials or advertisements are on the tape then the user must watch the entire tape to see all the advertisements. Even if a table of contents is provided at the beginning of the tape, there is no easy method of advancing the tape to the location of the selected advertisement. Another disadvantage of video cassette tapes with infomercials is that there is a significant recording, packaging and mailing expense with a large distribution.

Accordingly, there is a need in the art for apparatus and methods for an electronic guide with video and/or information clips and apparatus and methods for providing an index and automatic advancement of a tape to a selected video and/or information clip. There is also a need for apparatus and methods for receiving and recording an electronic guide with video and/or information clips that has been broadcast.

SUMMARY OF THE INVENTION

In the present invention, apparatus and methods for an electronic guide with video clips are provided.

In an embodiment of the present invention an apparatus for an electronic guide with video clips includes a video cassette recorder having an audio output, means for decoding audio signals on the audio output, means for commanding the video cassette recorder to freeze a video frame in response to the decoded audio signals, and means for displaying the video frame coupled to the video cassette recorder.

In a specific embodiment the apparatus comprises means for selecting a video clip for viewing from the displayed video frame coupled to the means for commanding, and means for controlling the video cassette recorder to play the selected video clip coupled to the means for commanding.

In another specific embodiment the apparatus further comprises means for selecting a video for later recording from the displayed video frame coupled to the means for commanding, and means for commanding the video cassette recorder to record the selected video coupled to the means for commanding.

In another specific embodiment the means for decoding further comprises an audio decoder.

In yet another specific embodiment the means for commanding the video cassette recorder to freeze a video frame comprises a processor means for issuing commands, and means for transmitting commands to the video cassette recorder.

In another specific embodiment the means for transmitting commands comprises an infrared transmitter.

In another specific embodiment the means for displaying the video frame comprises a television.

In another specific embodiment the means for selecting a video clip for viewing from the displayed video frame comprises a remote controller coupled to the processor means.

In yet another specific embodiment the means for controlling the video cassette recorder to play the selected video clip comprises means for processing the decoded audio signals to determined a number of index marks to either forward or rewind the tape to position the tape at a beginning of the selected program, means for commanding the video cassette recorder to forward or rewind the tape by the determined number of index marks, and means for commanding the video cassette recorder to play the tape.

In another specific embodiment the means for commanding the video cassette recorder to record the selected video comprises means for decoding a compressed code, the code compressed in length from the combination of channel, date, time-of-day and length information for a program.

In another embodiment of the present invention a method for providing an electronic guide with video clips for playing in a video cassette recording, comprises the steps of providing a video cassette tape having a first length of video cassette tape having a first index mark written in the control track near the beginning of the first length and a second index mark written in the control track near the end of the first length, a guide grid to video clips on the video cassette tape written in the video track between the first and second index mark, and guide data written as tones in the audio track between the first and second index mark, the guide data associated with the guide grid including for each video clip contained on the video cassette tape a number of index marks either forward or backward on the tape from the guide data to the video clip, and providing a plurality of video clips on the video cassette tape, each video clip having a third index mark written in the control track near the beginning of the video clip and a fourth index mark written in the control track near the end of the video clip, video for the video clip written in the video track between the third and fourth index mark, and audio to accompany the video written in the audio track between the third and fourth index mark.

In a specific embodiment The method further comprises the steps of playing the video cassette tape on the video cassette recorder, detecting a stillframe command in the audio track, sending a stillframe command to the video cassette recorder, displaying the guide grid, selecting a video clip to view from the guide grid, commanding the video cassette recorder to advance or rewind the video cassette tape to the selected video clip by advancing or rewinding a number of index marks according to the guide data associated with the selected video clip, and sending a command to the video cassette recorder to play the selected video clip.

In another specific embodiment the method further comprises the steps of selecting a program to record from the guide grid, sending a compressed code, representative of, and compressed in length from, the combination of a channel, a date, a time-of-day, and a length for the selected program to the video cassette recorder.

In another embodiment of the present invention a method for providing an electronic guide with video clips comprises the steps of broadcasting an electronic guide with video clips, the broadcast providing a signal having a video component and an audio component, providing a first length of the broadcast having a message to initialize the electronic guide before use broadcast in the video component, and a broadcast indication broadcast in the audio component, providing a second length of the broadcast having a first index mark broadcast before the end of the second length and a second index mark broadcast near the end of the second length, and a title screen broadcast in the video component along the second length, and providing a third length of the broadcast having a third index mark broadcast near the beginning of the third length and a fourth index mark broadcast near the end of the third length, a guide grid to video clips broadcast in the video component between the third and fourth index mark, and guide data associated with the guide grid broadcast in the audio component between the third and fourth index mark, the guide data including for each video clip contained in the broadcast a number of index marks either forward or backward in the broadcast from the guide data to the video clip, and providing a plurality of video clips in the broadcast, each video clip having a fifth index mark broadcast near the beginning of the video clip and a sixth index mark broadcast near the end of the video clip, video for the video clip broadcast in the video component between the fifth and sixth index mark, and audio to accompany the video broadcast in the audio component between the fifth and sixth index mark.

In a specific embodiment the method further comprises the steps of recording the electronic guide with video clips on a video cassette recorder as the electronic guide is broadcast with the broadcast video component and audio component written into the video cassette tape video track and audio track, respectively, ignoring any stillframe commands in the broadcast in response to the broadcast indication broadcast in the audio track, and detecting any index marks in the broadcast and for each index mark detected in the broadcast sending a index mark command to the video cassette recorder to write a index mark in the control track of the video cassette tape as the broadcast is recorded on the video cassette tape.

In another specific embodiment the method further comprises the steps of rewinding the video cassette tape after the broadcast is complete, playing the video cassette tape, displaying the message to initialize the electronic guide before use to a user, and erasing in response to an initialization command the first length of the recorded video cassette tape having a message to initialize the electronic guide before use written in the video track, and a broadcast indication written in the audio track.

In another specific embodiment the step of responding to an initialization command by erasing the first length of the recorded video cassette tape further comprises the steps of sending to the video cassette recorder a first stop command, then a rewind command for about 30 seconds, then a second stop command, then a record command for about 45 seconds, and then a third stop command.

In another specific embodiment the method further comprises the step of requiring the user to obtain and enter a key number.

In yet another specific embodiment the step of displaying the message to initialize the electronic guide before use further comprises the step of retrieving a key indication from the audio track.

In another specific embodiment the step of responding to an initialization command further comprises the steps of comparing the entered key with the key indication, and if the entered key and the key indication do not compare then not performing the step of erasing the first length of the recorded video cassette tape having a message to initialize the electronic guide before use written in the video track, and a broadcast indication written in the audio track.

In another embodiment of the present invention an apparatus for an electronic guide with video clips comprises a video cassette tape having a first length of video cassette tape having a first index mark written in the control track near the beginning of the first length and a second index mark written in the control track near the end of the first length, a guide grid to video clips on the video cassette tape written in the video track between the first and second index mark, and guide data written as tones in the audio track between the first and second index mark, the guide data associated with the guide grid having data for each video clip listed on the guide grid.

In a specific embodiment the guide grid comprises an index of video clips contained on the video cassette tape.

In another specific embodiment the guide data comprises for each video clip contained on the video cassette tape a number of index marks either forward or backward on the tape from the guide data to the video clip.

In another specific embodiment the apparatus further comprises a second length of the video cassette tape having a third index mark written in the control track near the beginning of the second length and a fourth index mark written in the control track near the end of the second length, a video clip written in the video track between the first and second index mark, and audio to accompany the video clip written in the audio track between the first and second index mark.

BRIEF DESCRIPTION OF THE DRAWINGS

The features of specific-embodiments of the best mode contemplated of carrying out the invention are illustrated in the drawings, in which.

DETAILED DESCRIPTION OF THE SPECIFIC EMBODIMENTS

Figure 1:
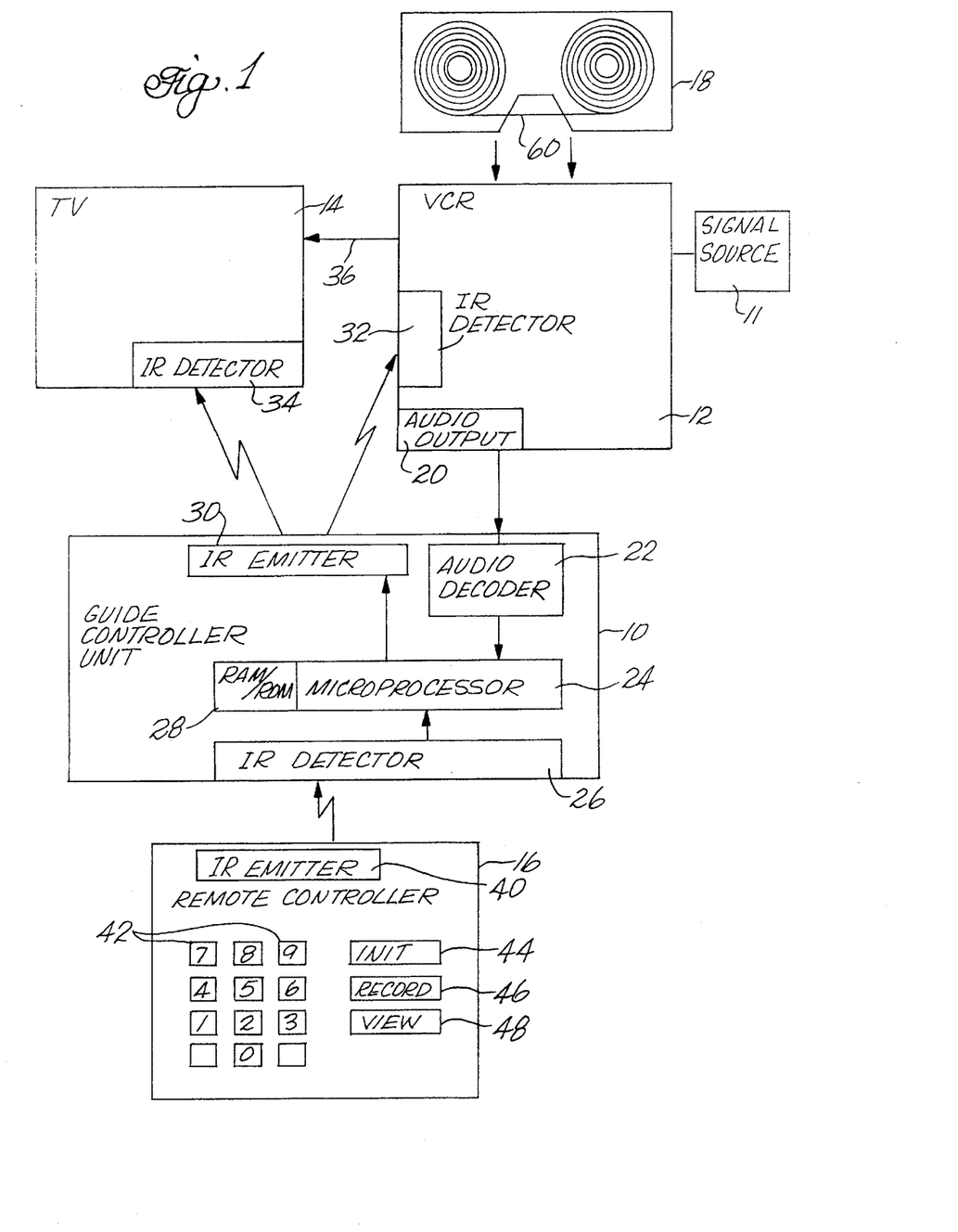
FIG. 1 is a schematic showing apparatus for an electronic guide with video clips according to the present invention.

Referring to the drawings, a guide controller unit 10 is shown in FIG. 1. The guide controller unit 10 is coupled to the VCR audio output 20 of the video cassette recorder 12. When a video cassette tape 18 is played in the video cassette recorder 12, the program recorded on the tape can be viewed on television 14, which receives the television signal on line 36. The video cassette tape 18 may be a prerecorded tape, or can be created by recording on the video cassette recorder 12 the signals from signal source 11. The signal source 11 can include sources such as a television antenna, a television cable, or a satellite converter.

The guide controller unit 10 has a audio decoder 22 which is connected to VCR audio output 20, a microprocessor 24 with a memory 28, an infrared emitter 30, and an infrared detector 26. As shown in FIG. 1, the microprocessor 24 communicates with audio decoder 22, infrared emitter 30, infrared detector 26 and memory 28. The remote controller 16 communicates with guide controller unit 10 and has number keys 42, an initialization key 44, a record key 46 and a view key 48, the operation of which are explained further below. The remote controller 16 has an infrared emitter 40 that can communicate to infrared detector 26 on guide controller unit 10.

The infrared emitter 30 on guide controller unit 10 communicates with both the infrared detector 32 on video cassette recorder 12 and the infrared detector 34 on television 14. The remote controller 16 does not operate the video cassette recorder 12 or television 14 directly. The remote controller 16 communicates with guide controller unit 10 and the guide controller unit 10 controls the video cassette recorder 12 and television 14 through the emissions of infrared emitter 30 to the infrared detector 32 and the infrared detector 34.

The television 14 is assumed to have a mute control feature for turning off the sound of the television upon command. The video cassette recorder 12 is assumed to have the following features: play, rewind, record, stop, index mark and still frame.

Figure 2A:
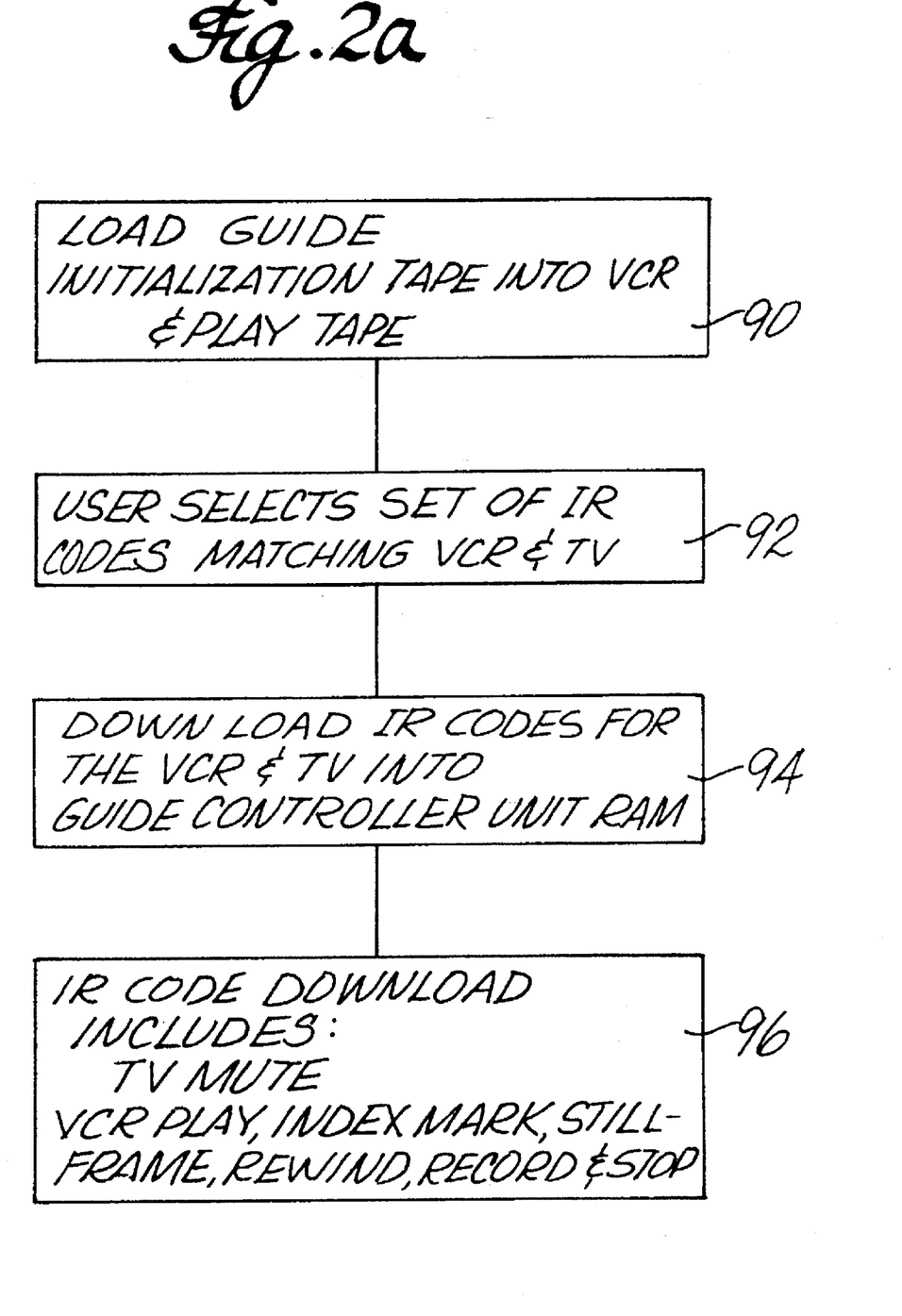
FIG. 2a is a flow graph of steps for initializing the apparatus for an electronic guide with video clips according to the present invention.

FIG. 2a is a flow graph of steps for initializing the apparatus for an electronic guide with video according to the present invention. A special initialization tape is loaded into the video cassette recorder 12 in step 90 and the initialization tape is played. The initialization tape has encoded in its audio track the infrared code libraries for substantially all types of VCRs and televisions. When the tape is played, video cues are displayed on the television 14 to enable the user to locate the codes for the particular type of television and VCR in use. Then the infrared codes for the user's VCR and television are downloaded into memory 28 via VCR audio output 20. The audio decoder 22 decodes the audio output signal and the microprocessor 24 stores the infrared codes into memory 28. Alternately the infrared codes for the televisions and VCRs can be stored in ROM in memory 28 and the user is provided a method of selecting the proper subset of infrared codes to match the particular television and VCR in use. Once the infrared codes have been loaded into the memory 28 of the guide controller unit 10 the user can play a video cassette tape 18 with an electronic guide with video clips.

Referring to FIG. 2a, the initialization sequence for the guide controller unit 10 is to first load the initialization tape into the VCR and play the initialization tape in step 90. Then the user selects a set of infrared codes matching his particular VCR and television in step 92. Then in step 94 the infrared codes are downloaded from video cassette recorder 12 via VCR audio output 20 and audio decoder 22 into memory 28. The downloaded infrared codes include codes for television mute, VCR play, VCR rewind, VCR record, VCR stop, VCR index mark, and VCR still frame, as shown in step 96.

Figure 2B:
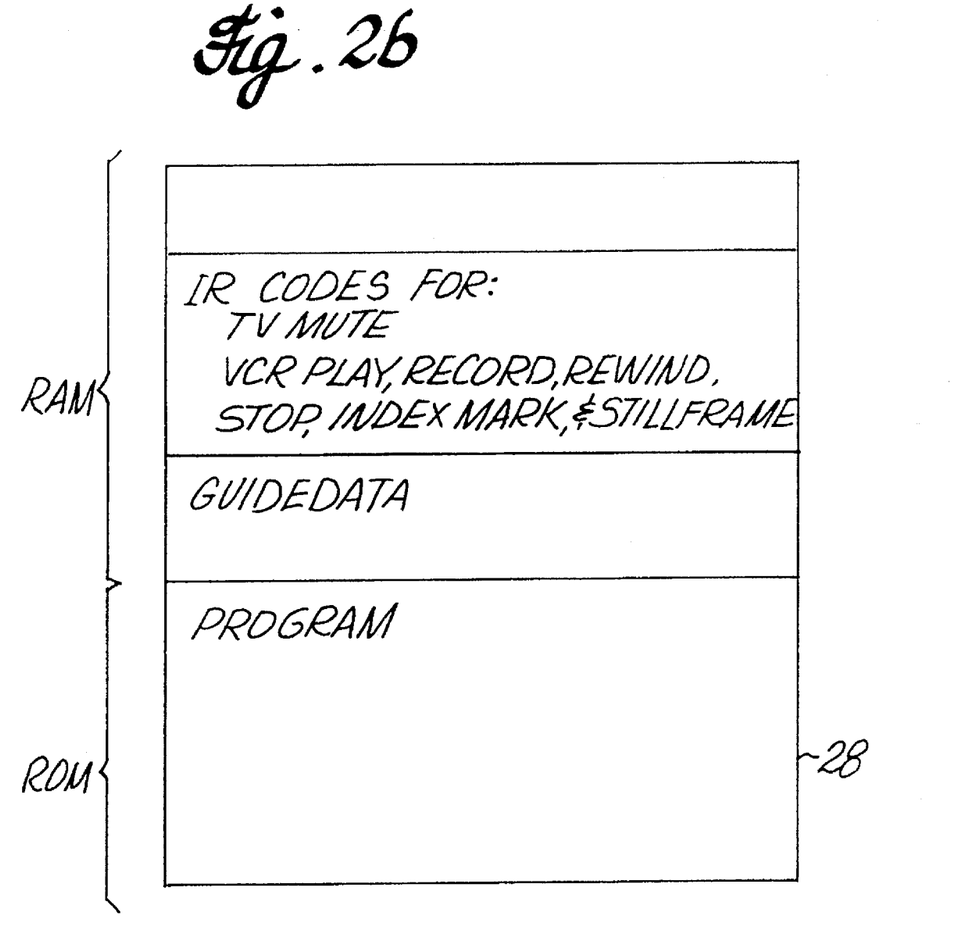
FIG. 2b is a design of the random access memory and the read only memory of the apparatus for an electronic guide with video clips according to the present invention.

FIG. 2b is a diagram of the contents of memory 28 including a read only memory portion for storing a program and random access memory portion for storing the infrared codes for the television and the VCR.

Figure 3:
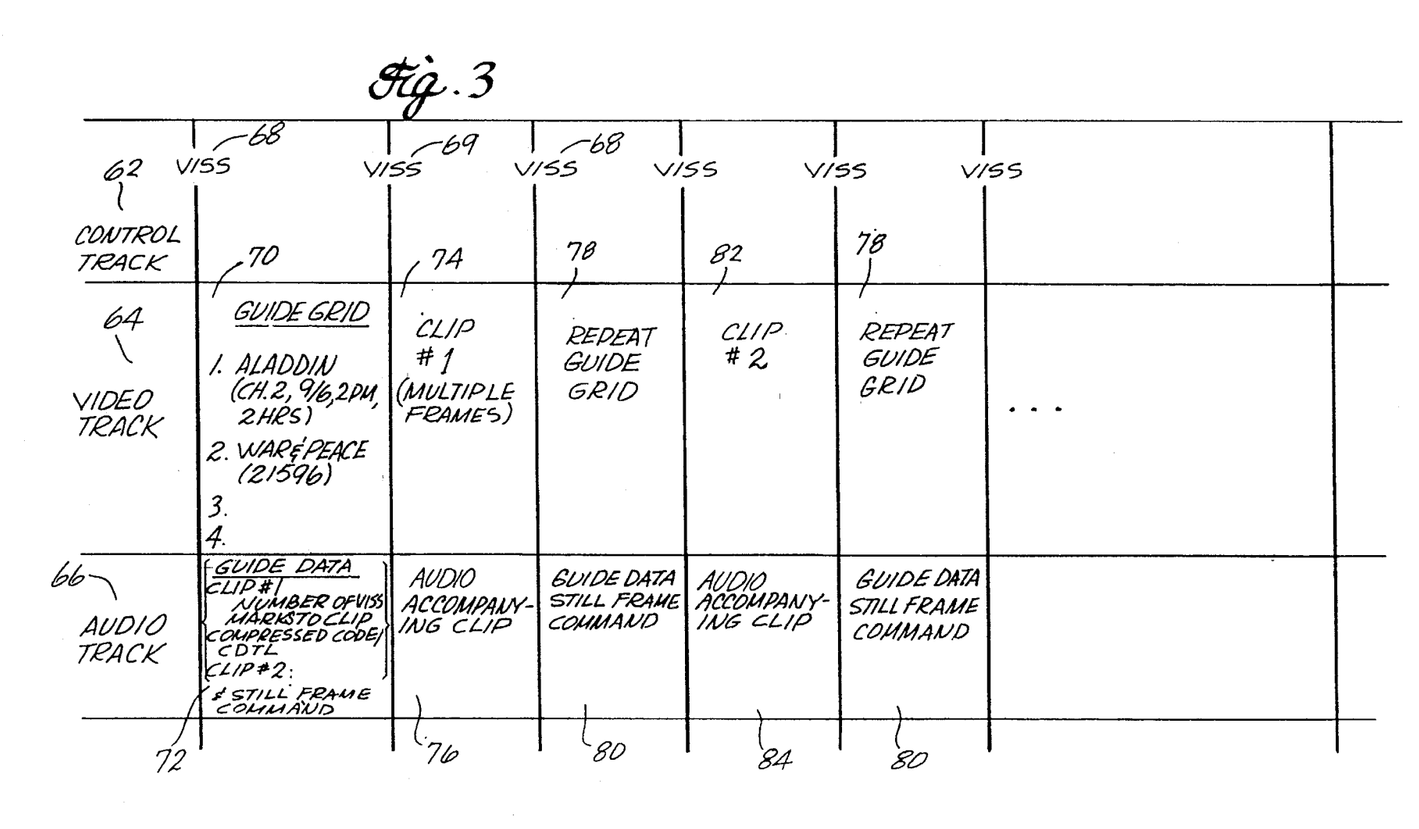
FIG. 3 is a drawing showing a tape layout having an electronic guide with video clips according to the present invention.

FIG. 3 is a drawing showing a tape layout having an electronic guide with video clips according to the present invention. The tape has a control track 62, a video track 64 and an audio track 66. As shown in FIG. 3, the first length of the tape has a VISS mark 68 in the control track 62. Second VISS mark 69 is also in control track 62. Between VISS mark 68 and VISS mark 69 a guide grid 70 is in the video track 64. As shown in FIG. 3, the guide grid 70 consists of an index to video clips on the tape. For example, the first video clip is *Aladdin* which will be shown on channel 2 on Sep. 6th at 2:00 p.m. and has a length of two hours. The second video clip is *War and Peace* which has a compressed code of 21596. The compressed code is encoded CDTL information and compressed codes and their use are more fully explained in patent application Ser. No. 07/829,412, filed Feb. 3, 1992, which is incorporated herein by this reference, as though set forth in full.

In audio track 66, guide data associated with the guide grid is encoded as audio tones. The guide data 72 includes for each video clip on the guide grid 70, the number of VISS marks from the guide grid to the video clip. Also, a compressed code associated with the video clip can be encoded as tones within the guide data 72. Alternately, the channel, date, time of date and length (CDTL) or another program identifier can be encoded as tones within the guide data for each video clip. At the end of the guide data is a still frame command, which is encoded as tones in the audio track 56.

In a second length of the tape following the guide grid and the guide data, the first video clip is located with the video for the clip written in the video track 64 and the audio that accompanies the video written within the audio track 66. A VISS mark is written at the beginning of the video clip in control track 62 and a VISS mark is also written at the end of the video clip in control track 62.

Following the video clip, the guide grid is repeated in video track 64, as shown by guide grid 78 in FIG. 3 and guide data 80 is written into audio track 66. The guide data 80 is not the same as the guide data 72, because the number of VISS marks to a video clip from guide data 80 is different from the number of VISS marks to a video clip from guide data 80. As shown in FIG. 3 the second video clip follows guide grid 78 and the audio 84 accompanying the second video clip is written in audio track 66. The pattern of repeating the guide grid and guide data after each video clip is repeated across the tape. As the tape is played on video cassette recorder 12 the guide grid is displayed on television 14 and the guide data is sent via VCR audio output 20 and audio decoder 22 to microprocessor 24. At the end of the guide data is a still frame command. When this is decoded by audio decoder 22 the microprocessor 24 sends a still frame command via infrared emitter 30 and infrared detector 32 to video cassette recorder 12. The guide grid is then displayed as a frozen frame on television 14. To access a video clip the user pushes one of the number keys 42 and then pushes view key 48. The guide controller unit 10 sends index commands to video cassette recorder 12 via infrared emitter 30 and infrared detector 32 to advance or rewind the tape to the video clip selected by the user. This is accomplished by guide controller unit 10 by processing the decoded guide data to determine the number of VISS marks forward or backward on the tape to the video clip selected by the user. The guide controller unit 10 then via infrared emitter 30 and infrared detector 32 commands the video cassette recorder 12 to advance or rewind by the number of VISS marks to the selected video clip.

Figure 4:
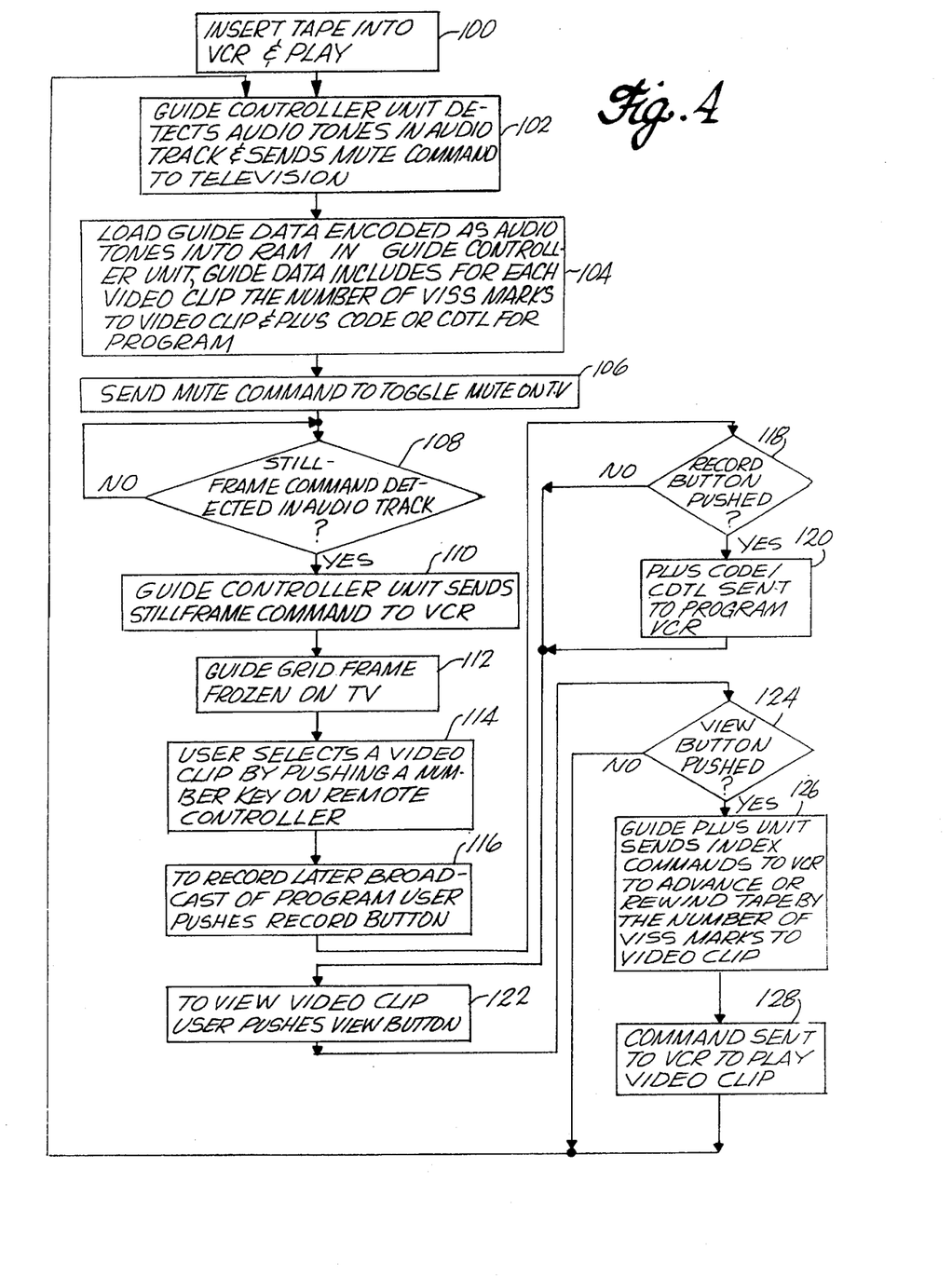
FIG. 4 is a flow graph of steps for using the apparatus for an electronic guide with video clips according to the present invention.

The steps for using the apparatus for an electronic guide with video clips according to the present invention is further described in FIG. 4. In step 100, a tape 18 with an electronic guide with video clips, such as shown in FIG. 3, is inserted into video cassette recorder 12 and the video cassette recorder 12 is commanded to play the tape. In step 102 the guide controller unit 10 decodes the audio tones in the tape audio track, which are sent to guide controller unit 10 via VCR audio output 20 to audio decoder 22. Upon determining the audio tones are being received the guide controller unit 10 sends a mute command to television 14. Sending the mute command avoids the annoyance the audio tones would otherwise cause to a listener. Then in step 104 the guide data is loaded into the RAM portion of memory 28. As explained before, the guide data includes for each movie clip on the tape the number of VISS marks to the video clip and optionally encoded CDTL information in a compressed code, or channel, date, time-of-day and length for a program that corresponds to the video clip. After the audio data has been stored in memory 28, the mute command may be sent again to television 14 via infrared emitter 30 and infrared detector 34 to toggle the mute switch on television 14 and turn the sound back on. Then in step 108 the guide controller unit 10 searches for a still frame command in the audio tones being sent via VCR audio output 20 to audio decoder 22 in guide controller unit 10. If a still frame command is detected in the audio track then the guide controller unit 10 sends a still frame command to video cassette recorder 12 thereby freezing the current frame being transmitted to the television from the VCR. In step 112 the guide grid is frozen on television 14. In step 114 the user selects a video clip to view by pushing a number key 42 on remote controller 16. For example, for the guide grid shown in FIG. 3, if the user wants to view the video clip for *War and Peace,* then the user would push the number key 2. After pushing the number for selected video clip then the user may also select to record the later broadcast of the program by pushing the record button 46 on remote controller 16, as shown in step 116. If the record button is pushed, as determined in step 118 then the compressed code or the CDTL information for the selected video clip is sent to video cassette recorder 12 to preprogram the VCR. The compressed codes are compressed from the combination of channel, date, time-of-day and length for a program and are now commonly published in newspapers to assist in the recording of programs on VCRs.

To view the selected video clip the user pushes view button 48, as shown in step 112 of FIG. 4. If the view button has been pushed as determined by step 124, then in step 126 the guide controller unit 10 sends index commands to video cassette recorder 12 to advance or rewind the tape by the number of VISS marks to the selected video clip. Then in step 128 a command is sent to video cassette recorder 12 to play the selected video clip. After the video clip is played the guide grid is repeated and the guide controller unit 10 again detects audio tones in audio track 56 and sends a mute command to the television as shown in step 102. Then steps 104, 106, 108, 110 and 112 are repeated and the user can select another video clip to view or to record. The first time the guide grid is displayed to the user, the user will most likely select to view a video clip and then the next time the guide grid is displayed to the user, the user having seen the video clip could decide to record the program when it is broadcast at a later time. To record the program, the user executes steps 116, 118 and 120.

In the description so far it has been assumed that the user is provided with a video cassette tape with an electronic guide with video clips. Another embodiment of the invention is to broadcast the electronic guide with video clips rather than to provide it directly on a video cassette tape. A number of issues arise when the electronic guide with video clips is broadcast rather than delivered on a video cassette tape. The first is that with a video cassette tape the user can be charged either a sales fee or a rental fee for the video cassette tape. In the case of a broadcast other provisions have to be made in order to charge the user for the electronic guide with video clips. The electronic guide with video clips can be broadcast on a channel at a time when the cost of transmission is low. In step 140 of FIG. 5 the first question is whether this is an electronic guide with video clips being received. If the broadcast is not an electronic guide with video clips broadcast then it is just a normal broadcast and a normal program for recording as shown in step 142. If it is an electronic guide broadcast then operation of guide controller unit 10 must be turned off during the receipt of the broadcast, so that the operations as described in FIG. 4 are not executed. For example, if during the broadcast the guide controller unit 10 is turned on, then still frame commands detected in the broadcast would result in a still frame command to the VCR. This would stop the recording of the broadcast. In step 146 of FIG. 5 the broadcast is recorded on tape by the video cassette recorder 12.

After the broadcast is complete the tape is rewind in step 148 and the guide controller unit 10 is turned on. Then to use the tape in the manner described in FIG. 4 the tape must be initialized. In step 150 the user pushes INIT key 44 on remote controller 16. One method of obtaining revenue for the use of the electronic guide with video clip broadcast is to have the user call a 900 number to obtain a key number as shown in step 152. The user then enters the key number on remote controller 16 as shown in step 154. In step 156 the entered key number is sent to guide controller unit 10 from remote controller 16. Then in step 158 guide controller unit 10 sends a play command to video cassette recorder 12. At the beginning of the tape a key number has been received and recorded from the broadcast into the tape audio track. In step 160 the key number broadcast and recorded on tape is sent via the VCR audio output 20 to audio decoder 22 in guide controller unit 10 and compared to the key number that was entered on remote controller 16. If in step 162 it is determined that the entered key numbers and the broadcast key numbers do not compare, then in step 164 the operation of the guide controller unit 10 is aborted which prevents the guide controller unit 10 from operating properly to allow access of the video clips that are recorded on the tape. If the numbers do compare, then the tape will be initialized. In the broadcast VISS marks are not transmitted so the recorded tape at this point in the process has no VISS marks written on the tape. However, the broadcast does have audio tones in the audio track that are placed in the audio track at the location that a VISS mark should be located in the control track. These audio tones are encoded to represent an index mark. When an index mark audio tone is detected in audio decoder 22, then the guide controller unit 10 sends an index mark command to the video cassette recorder 12 and a VISS mark is written on the tape in the control track. This completes the initialization of the tape which can then be rewound and used in the manner described in FIG. 4.

Figure 5:
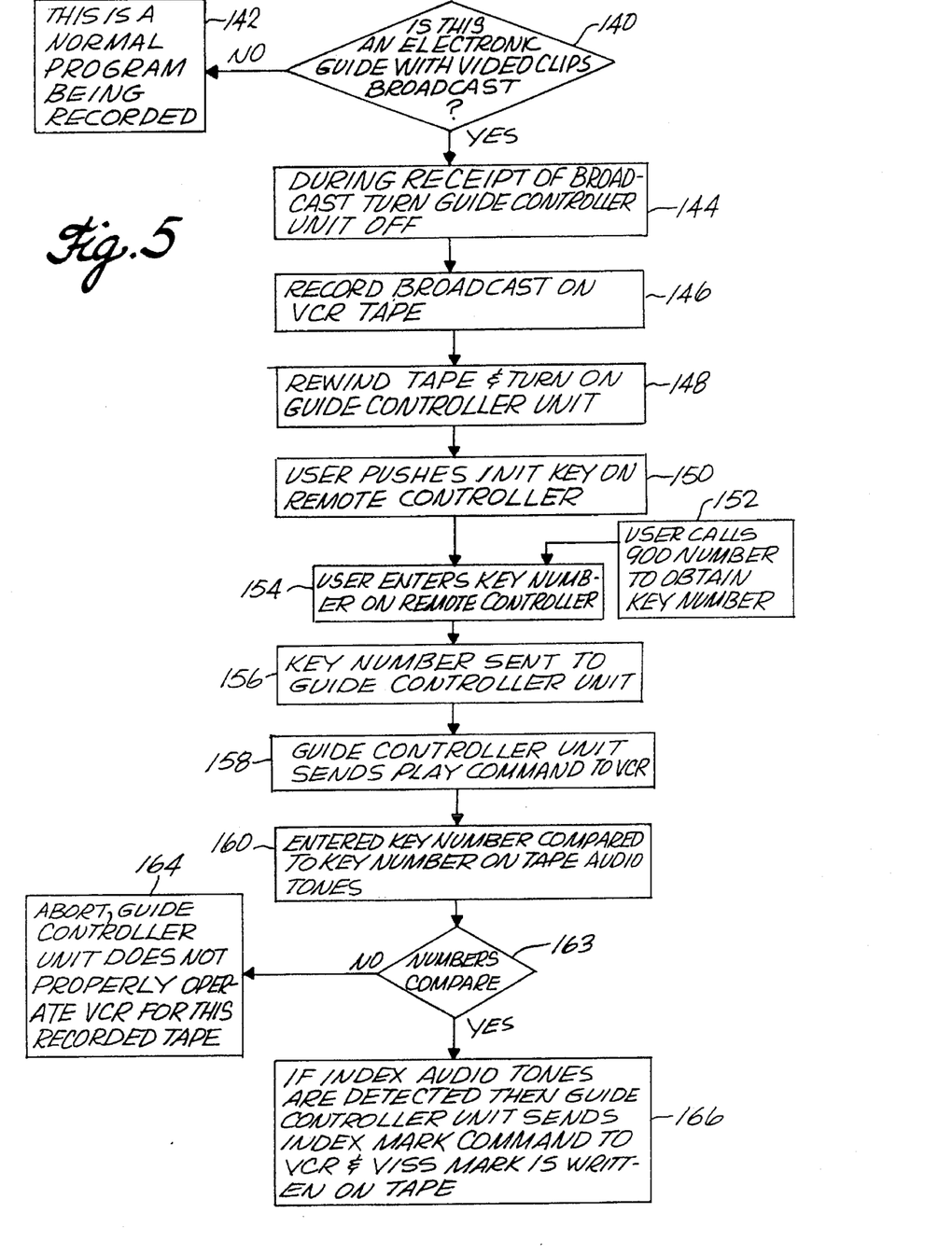
FIG. 5 is a flow graph of steps for using the apparatus for a broadcasted electronic guide with video clips according to the present invention.
Figure 6:
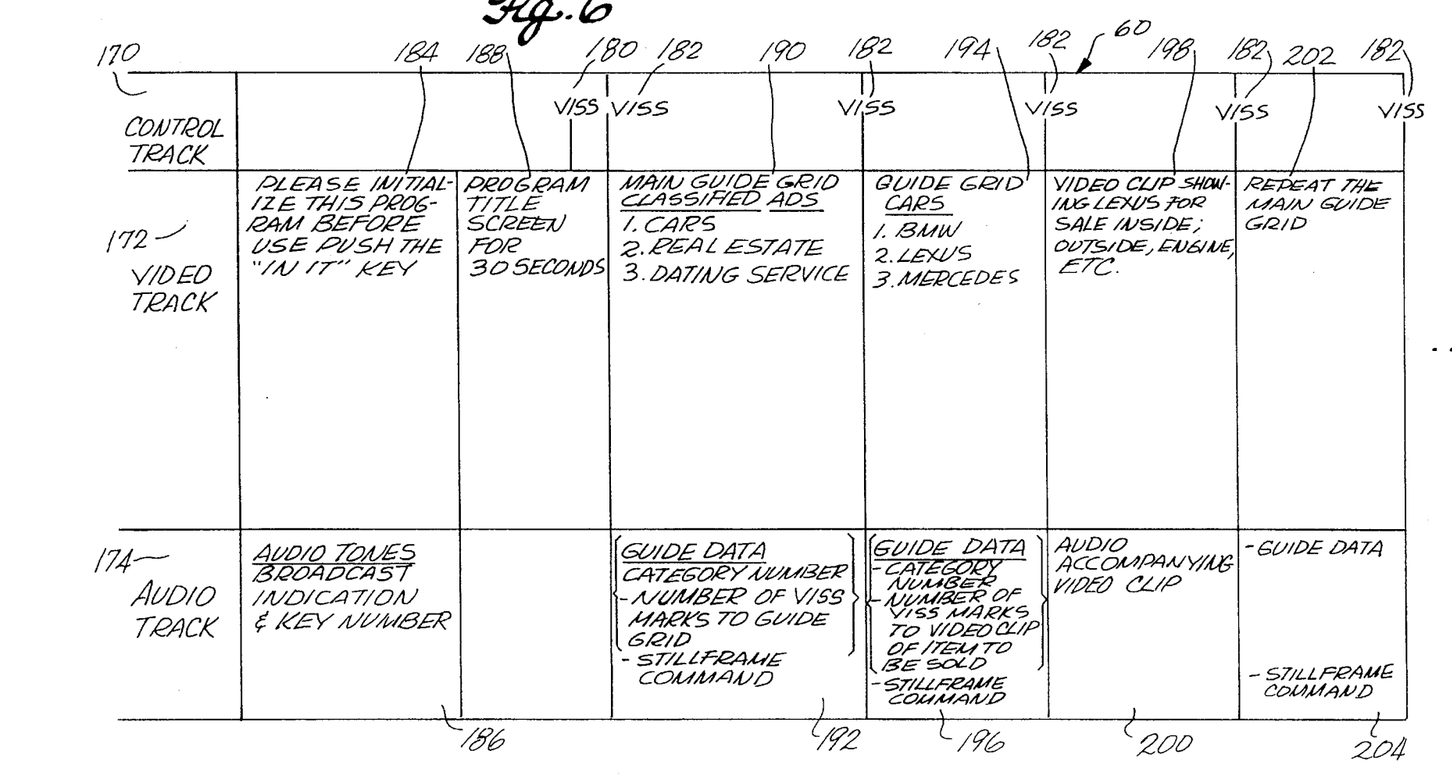
FIG. 6 is a drawing showing a tape layout having an electronic guide with information clips according to the present invention.

The method described in FIG. 5 is somewhat inconvenient because the guide controller unit 10 must be turned off during the broadcast. For a broadcast electronic guide with video clips, FIG. 6 illustrates an alternate layout of the information in the broadcast. The broadcasted electronic guide with video clips includes a video track and an audio track. In the video track there is a message at the beginning of the broadcast which indicates to the user to push the INIT key 44 in order to initialize the tape for use. In the audio track in position 186 there are audio tones encoded to provide a broadcast indication and also audio tones encoded to signify a key number. Following sections 184 and 186 of the broadcast is a title screen 188 which is broadcast for about thirty seconds. Following the title screen is a guide grid 190. Corresponding to guide grid 190 is the guide data 192 in the audio track 174.

FIG. 6 illustrates using an electronic guide with video clips for infomercials. The main guide grid 190 is an index to categories of infomercials and then each category has its own guide grid. For example, the guide grid for the cars selection in the main guide grid 190 is guide grid 194 which has a list of further selections for BMW, LEXUS and Mercedes. The guide data 192 stores the number of VISS marks to another guide grid, for example, guide grid 194. Each guide grid has a corresponding guide data in the audio track and at the end of the guide data is a still frame command. The still frame command freezes the guide grid on the television, which allows the viewer to select one of the items listed in the guide grid. The guide data has the number of VISS marks to the video clips corresponding the items listed in the guide grid. A video 198 showing data for a LEXUS has video 198 in the video track 172 and audio 200 in the audio track 174. After each video clip the main guide grid is repeated. Guide data corresponding to the main guide grid accompanies the guide grid in the audio track 174; however, the guide data on a repeated main guide grid such as guide data 204 is not the same as guide data 192, because the number of VISS marks to a selected entry is different for guide data 204 and guide data 192. If the infomercial format of FIG. 6 is not broadcast but is provided directly on tape, then the tape would not have the initialize message 184 and would not have the broadcast indication and the key number 186.

In a broadcast electronic guide with video clips, the VISS marks as shown in FIG. 6 are not present in the broadcast. So it is again necessary to insert the VISS marks into the control track of a tape that records the broadcast. FIG. 5 illustrates one method of inserting the VISS marks into the recorded tape which has been described; however, in FIG. 5 it was necessary to turn off the guide controller unit 10 in step 144.

Figure 7:
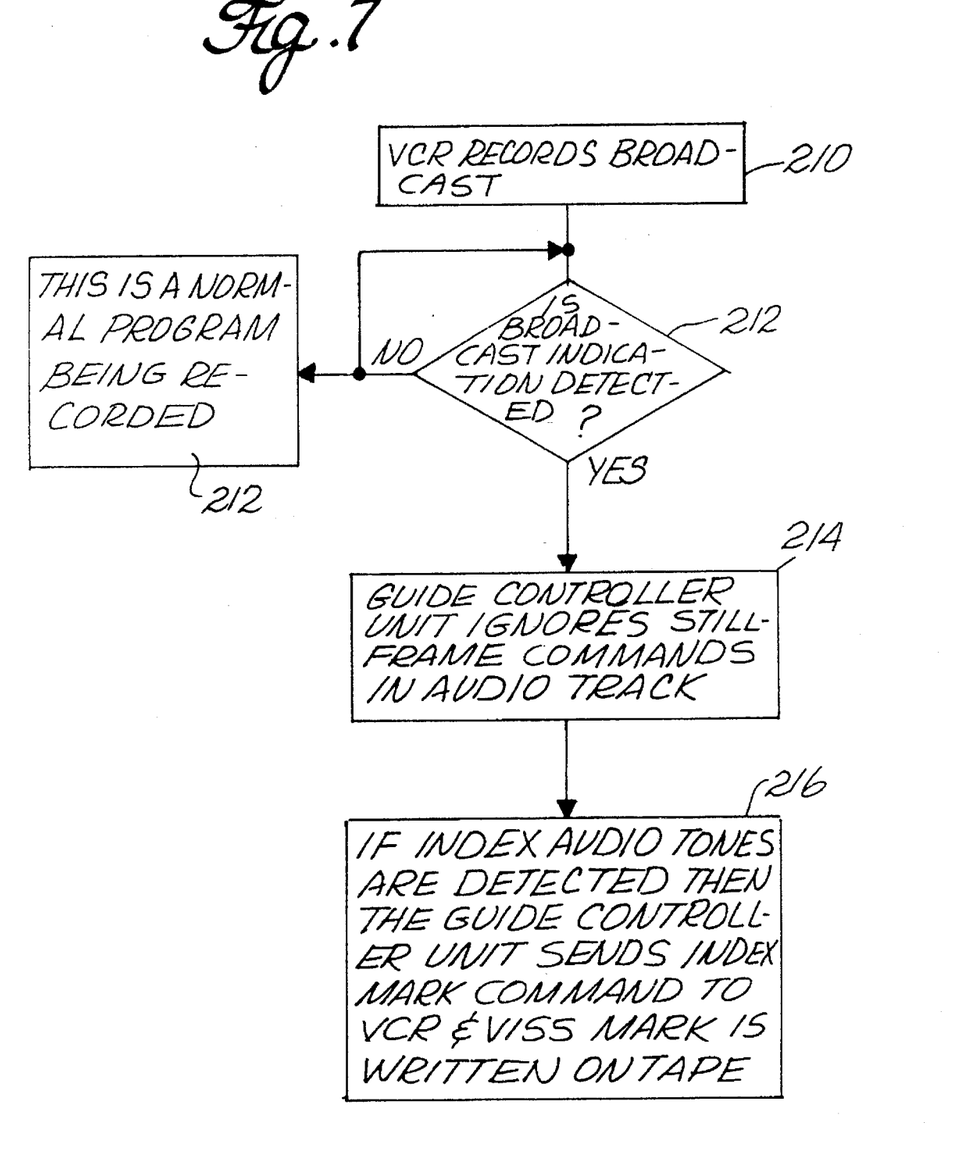
FIG. 7 is a flow graph of steps for initializing an electronic guide with VISS marks during a broadcast and recording of an electronic guide with video clips according to the present invention.

FIG. 7 shows an alternate way to insert VISS marks onto the tape that is recording the broadcasted electronic guide with video clips. In step 210 the VCR has been commanded to record a broadcast. As the VCR records the broadcast the audio track of the broadcast is sent via VCR audio output 20 to the audio decoder 22 in the guide controller unit 10. Step 212 determines whether a broadcast indication has been detected in the audio tones. If the broadcast indication is not detected than this just a normal program being recorded as indicated in step 212. If a broadcast indication is detected then the guide controller unit 10 ignores any still frame commands that are in the audio track and decoded by step 22. Index audio tones are transmitted in the broadcast at the locations where VISS marks are required to be written in the control track. In step 216 if index audio tones are received from the audio output 20 and decoded by audio decoder 22 then the guide plus unit 10 sends a index mark command to the video cassette recorder 12 which writes a VISS mark onto the control track of the tape. One advantage of this technique is that the VISS marks are written onto the tape during the broadcast of the electronic guide with video clips.

Figure 8:
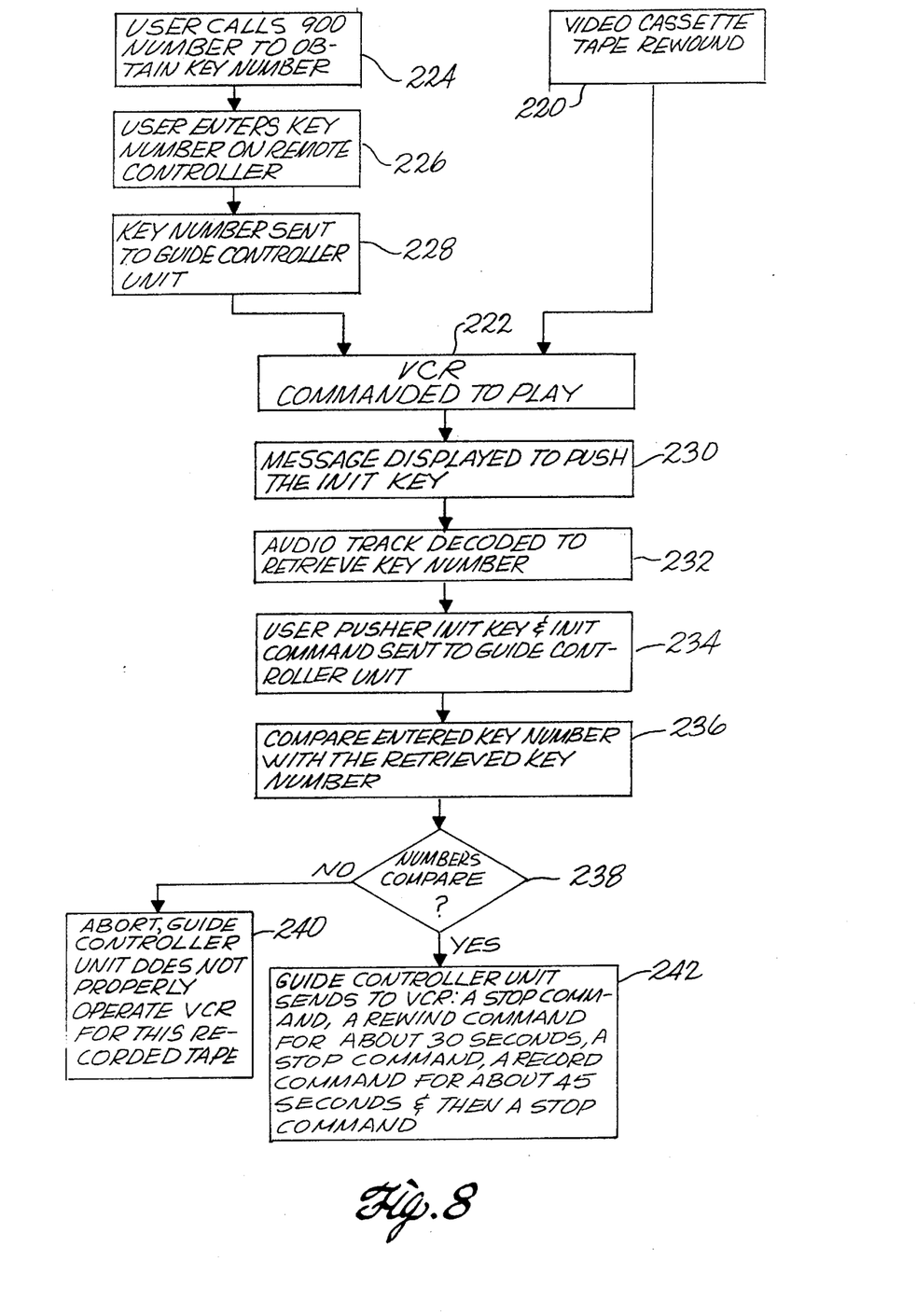
FIG. 8 is a flow graph of steps for initializing a tape after broadcast and recording of an electronic guide with video clips according to the present invention.

To use the tape that has been recorded by the steps of FIG. 7, the user must first rewind the tape as shown in step 220 of FIG. 8. Then to charge the user for using the electronic guide with video clips, in step 224 the user calls a 900 number to obtain a key number. In step 226 the user enters the key number on number keys 42 of remote controller 16. In step 228 the entered key number is sent to guide controller unit 10 and stored in memory 28. Then in step 222 the video cassette recorder 12 is commanded to play. The message 184 of FIG. 6 is displayed to the user asking the user to push the INIT key 44 on remote controller 16. The key number from guide data 186 in FIG. is retrieved from the audio track in step 232. In step 34 the user pushes the INIT key 44 and an initialization command is sent from remote controller 16 to guide controller unit 10. In step 236 the entered key number is compared with the retrieved key number. If the key numbers do not compare as determined by step 238, then the operation of guide controller unit 10 will be aborted in step 240 so that the tape will not operate properly in video cassette recorder 12. If the key numbers do compare, then guide controller unit 10 sends to the video cassette recorder 12 a stop command, then a rewind command for about thirty seconds, then a stop command, then a record command for about forty-five seconds and finally a stop command, as shown in step 242. Step 242 effectively erases from the tape the message 184 to initialize the tape and the corresponding audio tones which have the broadcast indication and the key number as shown in element 186 of FIG. 6. After step 242 is executed the tape may be played in the manner indicated in FIG. 4. The timing intervals of step 242 are chosen so that the VCR 12 will rewind far enough so that the tape is at a point before the broadcast data sequence of elements 184 and 186 of FIG. 6, and so that the VCR 12 stays in the record mode for a sufficient time to erase the broadcast data sequence including elements 184 and 186 of FIG. 6, stopping at a point where the video is displaying the title of the program. A VISS mark is placed near the end of the title screen 188 of FIG. 6, so that on subsequent play sessions the user can use the index feature of the VCR 12 to fast-forward to the title. With the broadcast data sequence 184 and 186 erased then when the tape is subsequently played the guide controller unit 10 will treat the tape as it would a prerecorded tape. For example, the still frame commands will not be ignored, and any index audio tones in the audio track will be ignored.

Again, the advantage of the methods of FIG. 7 and 8 is that the guide controller unit 10 does not have to be turned off during the broadcast of the electronic guide with video clips.

The electronic guide with video clips can be used for showing previews of television programs or movies and can also be used for classified advertisements and infomercials, such as for cars and real estate. The electronic guide with video clips can also be used for video magazines and yellow pages.

As an alternate embodiment to selecting video clips by entering a number corresponding to the program in the guide grid, the user may move a cursor on the screen to highlight a selection and enter such selection by pressing a button on the remote controller. In this embodiment, the guide data includes a screen map that contains information that correlates each entry in the guide to a position on a displayed screen. As the user moves the position of the cursor, the microprocessor processes the cursor commands from the remote controller and uses the screen map to know which entry in the guide is selected.

Thus, there has been described apparatus and methods for an electronic guide with video and information clips. Also there has been described apparatus and methods for providing an index for a tape and automatic advancement of a tape to a selected video and/or information clip. Methods and apparatus have been described for broadcasting an electronic guide with video and/or information clips.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed:

1. An apparatus for an electronic guide with video clips, the apparatus comprising:
   a video cassette recorder having an audio output;
   means for decoding audio signals on the audio output;
   means for commanding the video cassette recorder to freeze a video frame in response to the decoded audio signals; and
   means for displaying the video frame coupled to the video cassette recorder.

2. The apparatus of claim 1 further comprising:
   means for selecting a video clip for viewing from the displayed video frame coupled to the means for commanding; and
   means for controlling the video cassette recorder to play the selected video clip coupled to the means for commanding.

3. The apparatus of claim 2 further comprising:
   means for selecting a video for later recording from the displayed video frame coupled to the means for commanding; and
   means for commanding the video cassette recorder to record the selected video coupled to the means for commanding.

4. The apparatus of claim 3 wherein the means for decoding further comprises an audio decoder.

5. The apparatus of claim 4 wherein the means for commanding the video cassette recorder to freeze a video frame comprises:
   processor means for issuing commands; and
   means for transmitting commands to the video cassette recorder.

6. The apparatus of claim 5 wherein the means for transmitting commands comprises an infrared transmitter.

7. The apparatus of claim 1 wherein the means for displaying the video frame comprises a television.

8. The apparatus of claim 5 wherein the means for selecting a video clip for viewing from the displayed video frame comprises a remote controller coupled to the processor means.

9. The apparatus of claim 5 wherein the means for controlling the video cassette recorder to play the selected video clip comprises:
   means for processing the decoded audio signals to determined a number of index marks to either forward or rewind the tape to position the tape at a beginning of the selected video clip;
   means for commanding the video cassette recorder to forward or rewind the tape by the determined number of index marks; and
   means for commanding the video cassette recorder to play the tape.

10. The apparatus of claim 3 wherein the means for commanding the video cassette recorder to record the selected video comprises means for decoding a compressed code, the code compressed in length from the combination of channel, date, time-of-day and length information for a program.

* * * * *